US006782462B2

(12) United States Patent
Marion et al.

(10) Patent No.: US 6,782,462 B2
(45) Date of Patent: Aug. 24, 2004

(54) SYSTEM AND METHOD FOR TRACKING MEMORY LEAKS

(75) Inventors: Neal Richard Marion, Georgetown, TX (US); George Francis Ramsay, III, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 10/082,970

(22) Filed: Feb. 25, 2002

(65) Prior Publication Data

US 2003/0163661 A1 Aug. 28, 2003

(51) Int. Cl.[7] .............................................. G06F 12/00
(52) U.S. Cl. ....................... 711/170; 709/104; 707/200; 707/205; 707/206
(58) Field of Search ........................ 711/170; 709/104; 707/200, 205, 206

(56) References Cited

U.S. PATENT DOCUMENTS 6,125,434 A * 9/2000 Willard et al. ............... 711/170
6,560,773 B1 * 5/2003 Alexander et al. .......... 717/128
6,598,141 B1 * 7/2003 Dussud et al. ............... 711/170

OTHER PUBLICATIONS

Scholz et al., Symbolic pointer analysis for detecting memory leaks, Nov. 1999, Proceeding of the 2000 ACM SIGPLAN workshop, vol. 34 Issue 11.*

* cited by examiner

Primary Examiner—Donald Sparks
Assistant Examiner—Bao Q. Truong
(74) Attorney, Agent, or Firm—Joseph T. Van Leeuwen; Leslie A. Van Leeuwen

(57) ABSTRACT

A system and method for tracking memory leaks is presented. A user sets a memory tracking flag that notifies the system to track memory allocations and memory de-allocations. A memory array is initialized which includes multiple memory array slots. Each memory array slot includes a free flag and fields to store information corresponding to a memory allocation. When memory is allocated to an application or file, the system locates an unused memory array slot, sets the free flag to false, and stores memory allocation information in the memory array slot. When the application or file de-allocates the memory, the system locates the corresponding allocated memory array slot and sets the corresponding free flag to true, indicating a proper memory de-allocation. Upon shutdown, the system reviews the status of each free flag corresponding to each memory array slot, and generates a report which includes memory allocations that are not properly de-allocated.

17 Claims, 11 Drawing Sheets

1000

Sample X-Windows Memory Leak Report

Memory Leak Summary
- 50 mallocs that were not freed.
- 16972 bytes allocated that were not freed.

1010

Memory Leak Details

1020

| No. 1030 | File Name 1040 | Line Number 1050 | Size 1060 | Address (Pointer) 1070 |
|---|---|---|---|---|
| 1. | gsmnscr.c | 1140 | 32 | 0x2028c378 |
| 2. | ibmLoadExt.c | 273 | 80 | 0x2028b168 |
| 3. | aixFindisp.c | 154 | 52 | 0x2028bfb8 |
| 4. | aixFindisp.c | 335 | 96 | 0x2028bf18 |
| 5. | aixFindisp.c | 423 | 8 | 0x2028b858 |
| 6. | aixFindisp.c | 470 | 32 | 0x2028dd88 |
| 7. | connection.c | 322 | 12 | 0x2028dfe8 |
| 8. | main.c | 684 | 880 | 0x203df6d8 |
| ⋮ | ⋮ | ⋮ | ⋮ | ⋮ |
| 50. | utils.c | 1220 | 128 | 0x202a0fe8 |

*Figure 10*

SYSTEM AND METHOD FOR TRACKING MEMORY LEAKS

BACKGROUND OF THE INVENTION

1. Technical Field

The present invention relates in general to a system and method for identifying memory leaks. More particularly, the present invention relates to a system and method for tracking memory allocations and memory de-allocations using a minimal amount of system resources.

2. Description of the Related Art

Computer programs request memory space upon start-up and during operation. Some applications request a large memory space in a single request while other applications request multiple, smaller amounts of memory during operation. Some applications require more memory to operate than others. For example, applications with graphic display functions typically require more memory than text-only based applications.

When an operating system receives a memory request, a memory manager determines if the requested memory size is available and where within the memory area the memory is available. If the memory is available, the memory manager sends the application a pointer, or handle, corresponding to the address location of the memory allocated to the application.

If the memory is not available, the memory manager sends a response to the application denying the request. The memory manager does not permit other applications to use allocated memory space assigned to other applications.

When an application is finished using memory, it notifies the memory manager and the memory manager indicates that the memory space is available for use by other applications. For example, an application may send a de-allocation request when the application terminates or when the memory is no longer needed by the application.

Some applications do not inform the memory manager to de-allocate memory when the application is through using the memory. The lack of properly de-allocating memory is called a "memory leak", or "resource leak". Memory leaks may degrade system performance due to the seeming unavailability of memory space.

Memory leak detection programs are available that track memory leaks. A challenge found with these programs is that they often require a significant amount of memory to operate. This memory usage contradicts the objective of efficiently using a system's memory space. In addition, traditional memory leak detection programs may not work properly or efficiently due to the amount of system resources required by the memory leak detection program.

In essence, traditional memory leak detection programs are challenged by the fact that they compete for system resources, such as memory and CPU time, with other applications running on the system. What is needed, therefore, is a way to allow the user to easily identify memory leaks during operation using a minimal amount of system resources. This information can then be used to correct identified memory leaks or, if source code is unavailable, to install comparable applications that manage memory more efficiently.

SUMMARY

It has been discovered that memory leak detection is achieved using a minimal amount of system resources by setting a memory leak flag which informs the system to initialize a memory array and store memory requests in memory array slots within the memory array.

A user sets a memory leak flag to notify the system to track memory allocations and de-allocations. The user may set the memory leak flag independently or the user may write a script that is run during start-up that sets the memory leak flag.

The operating system generates and initializes a memory array which includes multiple memory array slots. Each memory array slot includes a free flag, an allocation pointer field, and other fields to store information corresponding to a memory allocation. The free flag identifies whether memory allocation information is stored in the corresponding memory array slot. The free flag is set to false for an allocated memory array slot (i.e. memory allocation information is stored in the memory array slot). The allocation pointer corresponds to the memory location of the memory allocation.

When an application no longer requires the allocated memory, the application sends a de-allocation request to the operating system. The request includes a de-allocation pointer which corresponds to the memory location of the allocated memory. The operating system locates the allocated memory array slot corresponding to the de-allocation pointer and sets the corresponding free flag to true, signifying a proper memory de-allocation.

Upon shutdown, the operating system analyzes each free flag in the memory array. When the operating system locates a free flag that is set to false, the operating system retrieves the information in the corresponding allocated memory array slot. The memory array slot includes information corresponding to a memory allocation that has not been properly de-allocated (i.e. a memory leak). After each free flag is analyzed, the operating system generates a report which includes information, such as the application name, corresponding to each memory leak detected.

In a graphical user interface (GUI) environment, such as X-Windows running on a UNIX-based operating system, the memory leak technology can be used to detect memory leaks within the graphical environment components. In this embodiment, an environment variable is set before invoking X-Windows from the UNIX operating system. The environment variable turns memory leak tracing on within the X-Windows environment. X-Windows components process requests from applications and perform other operations to maintain the graphical environment. When memory leak tracing is activated, the a memory leak detector interfaces with the X-Windows memory manager to track components' use of memory. The memory leak detector stores information pertaining to components' use of memory in a memory usage array. When X-Windows is shutdown, or when a memory usage report is requested, a report is generated indicating which components have not released memory. In this manner, X-Windows system testers can determine which X-Windows components are not properly releasing memory. These components can then be modified so that memory is properly released when the component is finished using it.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 10 is a sample X-Windows memory leak report showing X-Windows components that did not release allocated memory.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
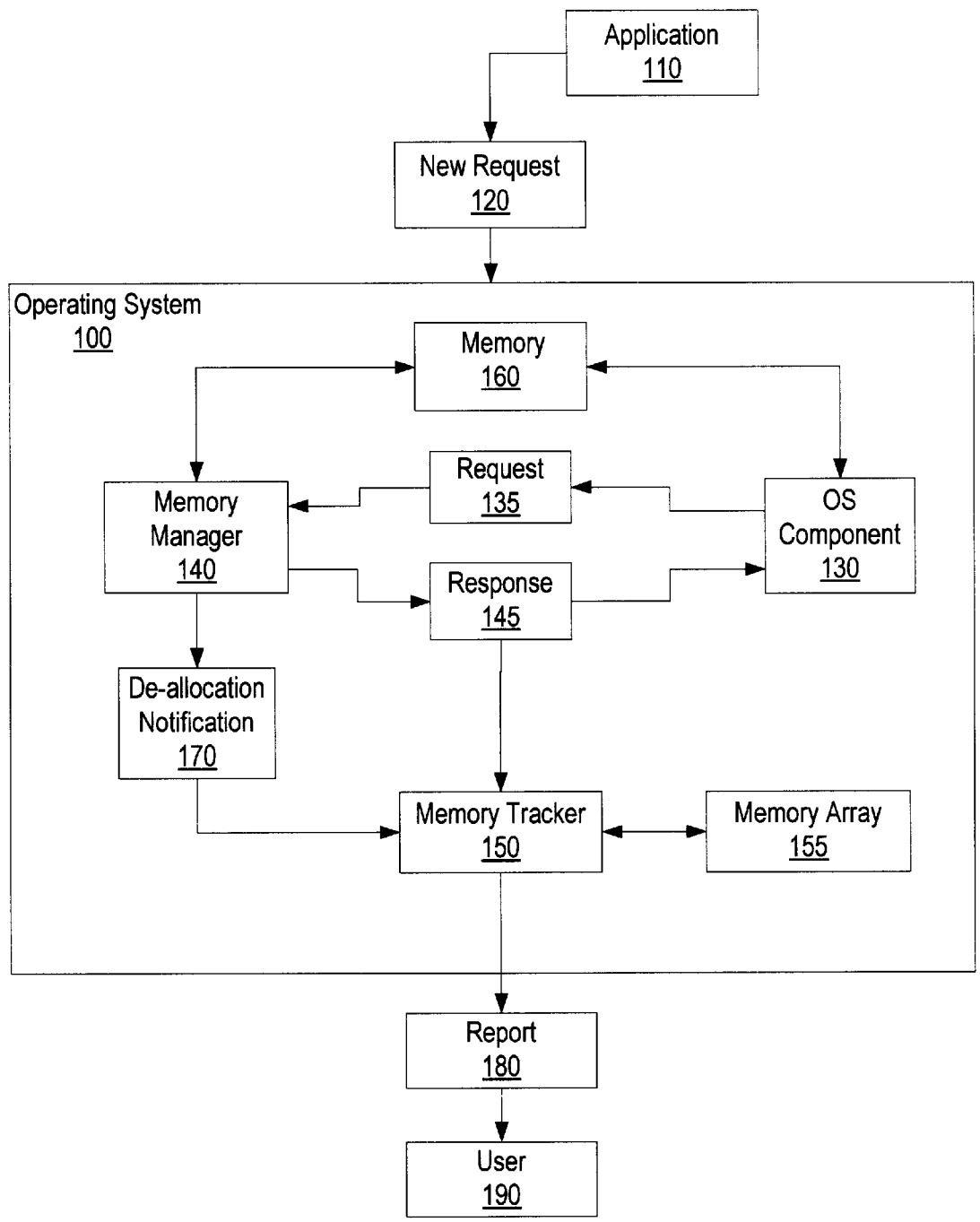
FIG. 1 is a block diagram of an application making a request and a component within an operating system requesting memory to fulfill the application request.

FIG. 1 is a block diagram of an application making a request and a component within an operating system requesting memory to fulfill the application request. Application 110 sends new request 120 to operating system 100. New request 120 includes a request to perform a specific function. In one embodiment, application 110 may be initializing and wish to open a spreadsheet window within an X-Windows environment.

Operating system 100 includes OS component 130 which is responsible for performing a function corresponding to the request. Using the embodiment described above, operating system 100 may be a UNIX operating system running X-Windows and OS component 130 may be responsible for opening a spreadsheet window within the X-Windows environment.

OS component 130 analyzes new request 120 and determines that memory is required to fulfill the request. OS component requests memory from memory manger 140 via request 135. Memory manager 140 reviews available memory by analyzing a look-up table and determines whether memory is available. Memory manager 140 sends response 145 to OS component 130 and memory tracker 150. If memory is not available, response 145 includes information denying the memory allocation request. OS component 130 may request a smaller amount of memory or forgo the request altogether.

If memory is available, response 145 includes a pointer corresponding to the address location of the allocated memory. OS component 130 uses the pointer information to access the appropriate location in memory 160. Using the embodiment described above, memory manager may have 2 MB available to fulfill the request and send a pointer corresponding to the location of the allocated memory.

Memory tracker 150 is responsible for tracking memory allocations and de-allocations. Memory tracker 150 may be a component within operating system 100 which is initiated by setting a memory leak flag (see FIG. 3 for further details). Memory tracker 150 stores allocation information within memory array 155. Memory array 155 includes multiple array slots. Each slot is able to store information corresponding to a memory allocation event. Each slot also includes a free flag which is set by memory tracker 150 when memory allocation information is stored in the corresponding slot (see FIG. 2 for further details regarding memory array slots).

Using the embodiment described above, memory tracker 150 identifies an available memory array slot within memory array 155 by analyzing the state of the corresponding free flag. Memory tracker 150 stores memory allocation information in the available memory array slot which includes the size of the memory (2 MB), the location within memory space (pointer), the name of OS component 130, and the location within the OS component where the memory request is called (i.e. line number). Memory tracker 150 also sets the corresponding free flag to false signifying that the slot now includes memory allocation information.

OS component 130 may frequently access memory 160 throughout a session. Using the embodiment described above, OS component 130 may use memory 160 until application 110 sends a request to close the window. When OS component 130 no longer requires memory 160, OS component 130 informs memory manager 140 to de-allocate the memory via request 135.

Memory manager 140 analyzes request 135 and de-allocates the memory. Memory manager 140 sends de-allocation notification 170 to memory tracker 150 corresponding to the memory de-allocation. De-allocation notification 170 includes pointer information for the corresponding de-allocation. Memory tracker 150 uses the pointer information to locate the corresponding allocated memory array slot and reset the free flag to true indicating that the allocated memory is now available.

Upon shutdown, memory tracker 150 generates report 180 which includes information regarding memory that is not properly de-allocated. Report 180 is sent to user 190 for analysis. In another embodiment, report 180 may be generated upon command for user 190 for real-time memory management analysis.

Figure 2:
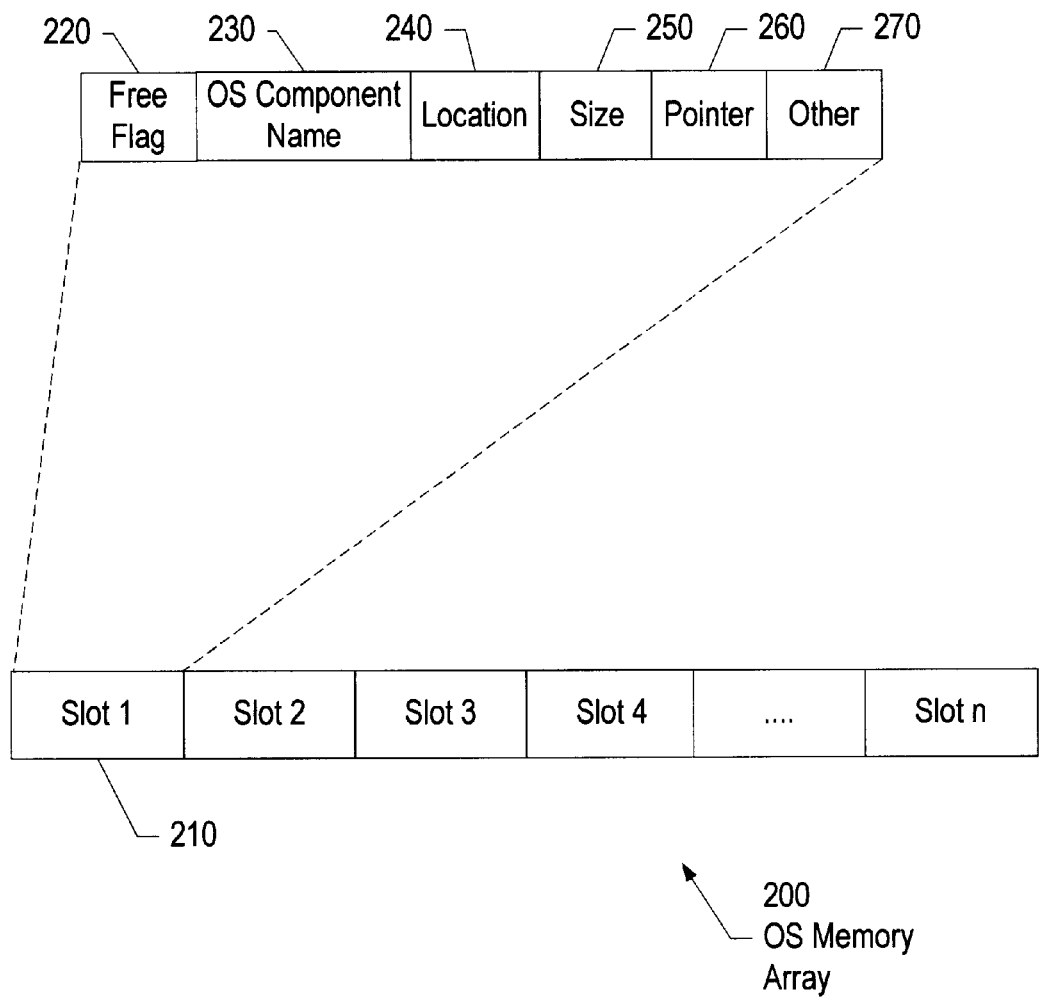
FIG. 2 is a diagram of an OS-memory array and details of a memory array slot.

FIG. 2 is a diagram of an OS-memory array and details of a memory array slot. OS memory array 200 includes n number of slots. Each slot stores information corresponding to a memory allocation. The amount of memory array slots may be set to a default value, such as 16K slots, or may be increased or decreased by the user. Slot 1 (210) is similar to the other slots and is described below.

Each slot includes fields free flag 220, OS component name 230, location 240, size 250, pointer 260, and other 270. Free flag 220 is set to false when the system stores memory allocation information in the slot. For example, when a memory request is granted to an OS component, the system stores memory allocation information in the slot and sets free flag 220 to false which signifies that the slot is an allocated memory array slot. Free flag 220 is set to true once a corresponding memory de-allocation is received from the OS component.

OS component name 230 includes the name of the OS component or file name that requests the memory allocation. The OS component name may be abbreviated or may be in entirety depending upon the length of the OS component name and the field length of OS component name 230. For example, if "openspreadsheet" is the name of the OS component that requests a memory allocation, then "openspreadsheet" is stored in OS component name 230 if OS component 230 is long enough to store the entire name. Otherwise, the component name may be abbreviated when it is stored, such as "openspreadsh".

Location 240 includes the address location within the OS component that requests the memory allocation. Using the example above, if line 1430 within openspreadsheet requests a memory allocation, then "line 1430" is stored in location 240.

Size 250 includes the amount of memory allocated to the corresponding memory allocation. Using the example above, if line 1430 within "openspreadsheet" requests 2 MB of memory, "2 MB"is stored in size 250.

Pointer 260 includes information corresponding to the location (i.e., starting address) of the allocated memory. Using the example above, if "0x2029378" is the starting address of the 2 MB of allocated memory, then "0x2029378" is stored in pointer 260.

Other 270 includes other information corresponding to the memory allocation that is used in memory tracking. For example, other 270 may include a timestamp of when the memory allocation was granted.

Figure 3:
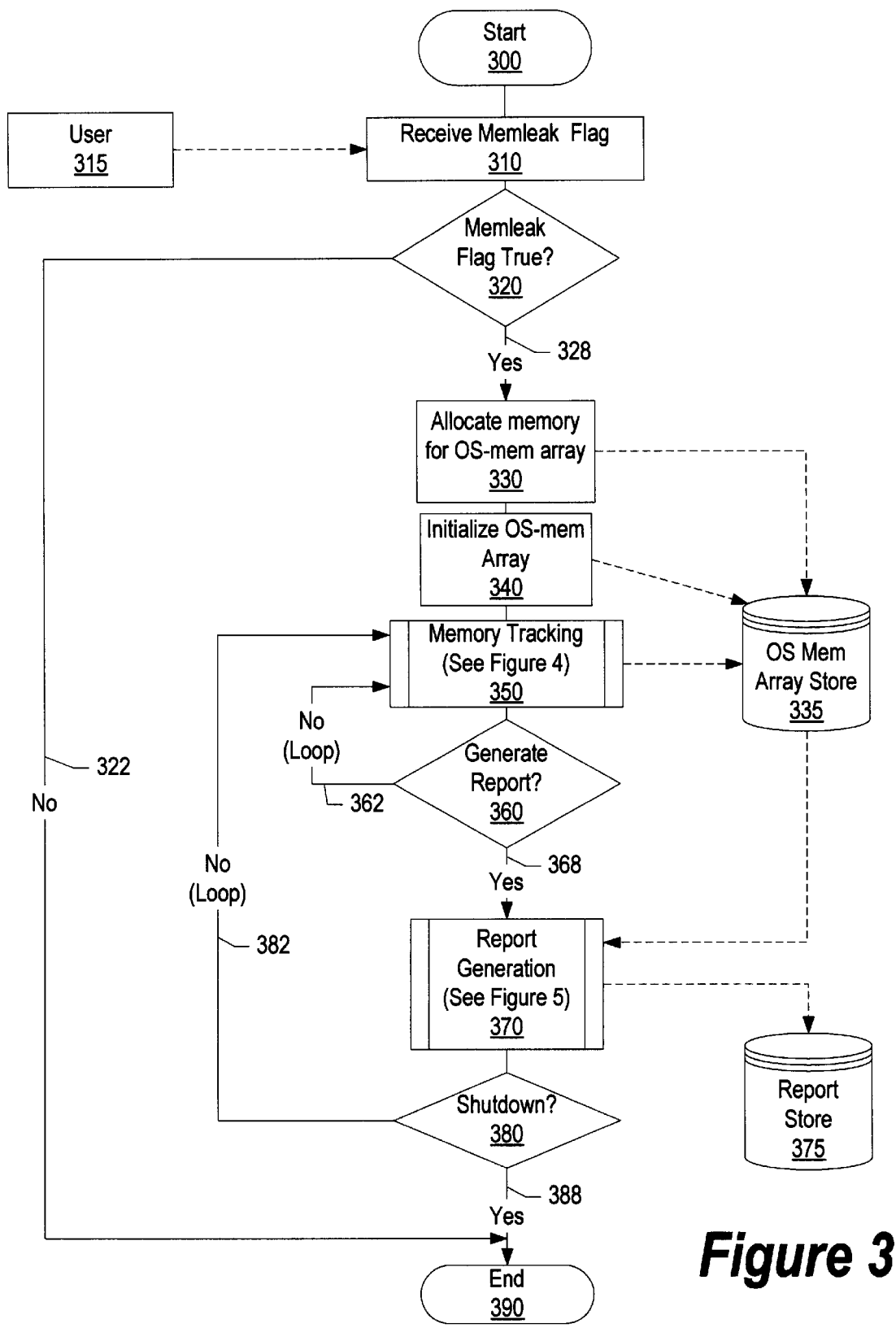
FIG. 3 is a high-level flowchart showing steps taken in initializing an OS-memory array and generating a memory leak report.

FIG. 3 is a high-level flowchart showing steps taken in initializing an OS-memory array and generating a memory leak report. Processing commences at 300, whereupon a memory leak flag is received from user 315 (step 310). The user sets the memory leak flag to notify the system to track memory allocations and de-allocations. The user may set the memory leak flag independently or the user may set the flag in a script during start-up.

A determination is made as to whether the user chooses to track memory leaks by the state of the memory leak flag (decision 320). If the user does not choose to track memory leaks, decision 320 branches to "No" branch 322 bypassing memory tracking steps.

On the other hand, if user 315 chooses to track memory leaks, decision 320 branches to "Yes" branch 328 whereupon memory is allocated for an OS-memory array in OS-memory array store 335 (step 330). The amount of memory array slots may be set to a default value or may be increased or decreased by the user. The OS-memory array is initialized at step 340. During memory array initialization, the memory used to store the memory array is allocated. Memory tracking commences (pre-defined process block 350, see FIG. 4 for further details).

A determination is made as to whether to generate a report (decision 360). If the user chooses not to generate a report, decision 360 branches to "No" branch 362 which loops back to continue memory tracking. This looping continues until the user chooses to generate a report, at which point decision 360 branches to "Yes" branch 368. For example, the user may select to generate a report during shutdown. Another example is the user may wish to generate a report during system execution for real-time memory management analysis.

Figure 5:
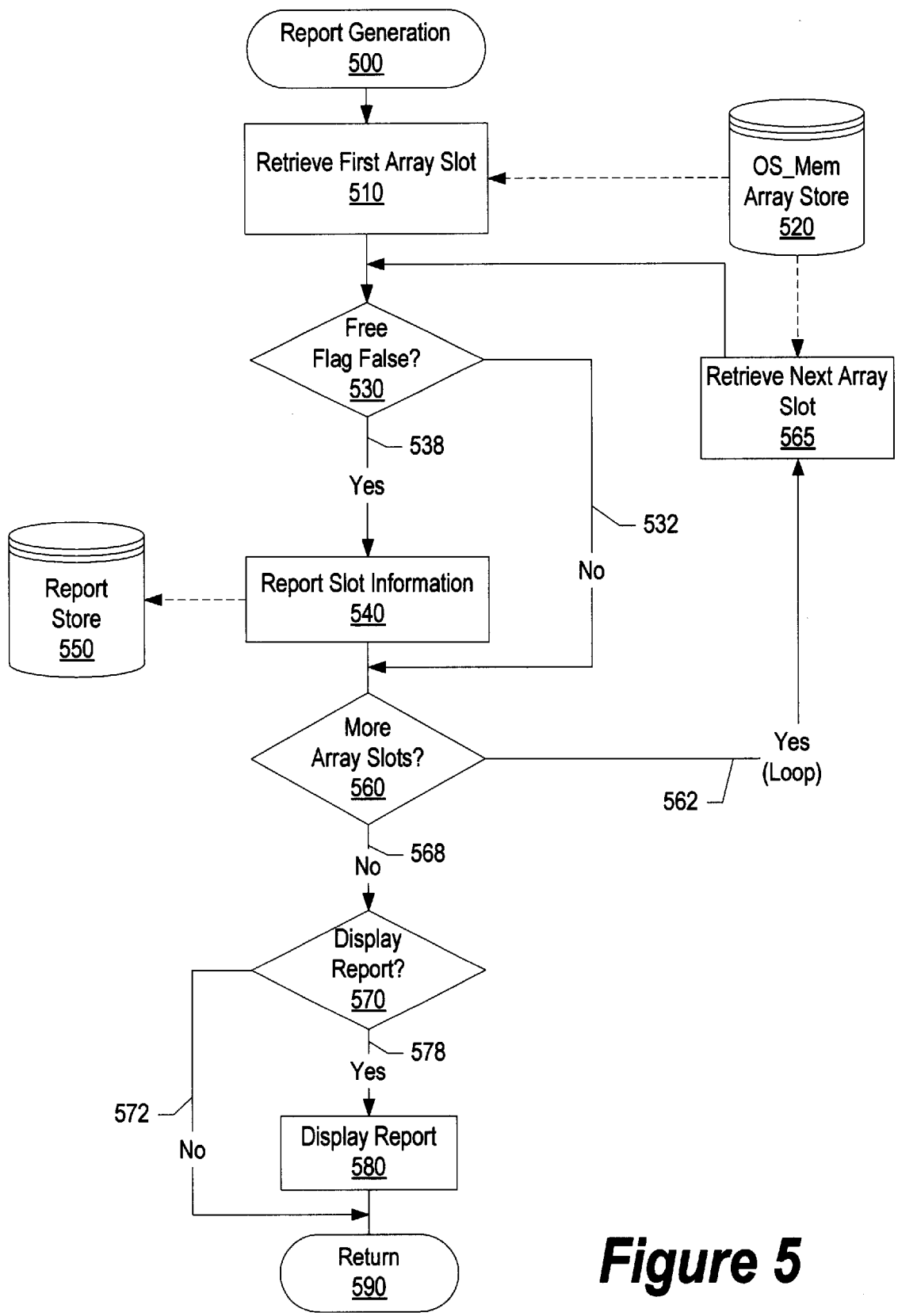
FIG. 5 is a flowchart analyzing memory array slots and generating a memory leak report.

When decision 360 branches to "Yes" branch 368, a report is generated using memory leak information in OS-memory array store 335 and stored in report store 375 (pre-defined process block 370, see FIG. 5 for further details). Report store 375 may be a non-volatile storage area such as a computer hard drive.

A determination is made as to whether processing is terminating (decision 380). If processing is not terminating, decision 380 branches to "No" branch 382 which loops back to continue system execution. This looping continues until processing shuts down, at which point decision 380 branches to "Yes" branch 388. Processing ends at 390.

Figure 4:
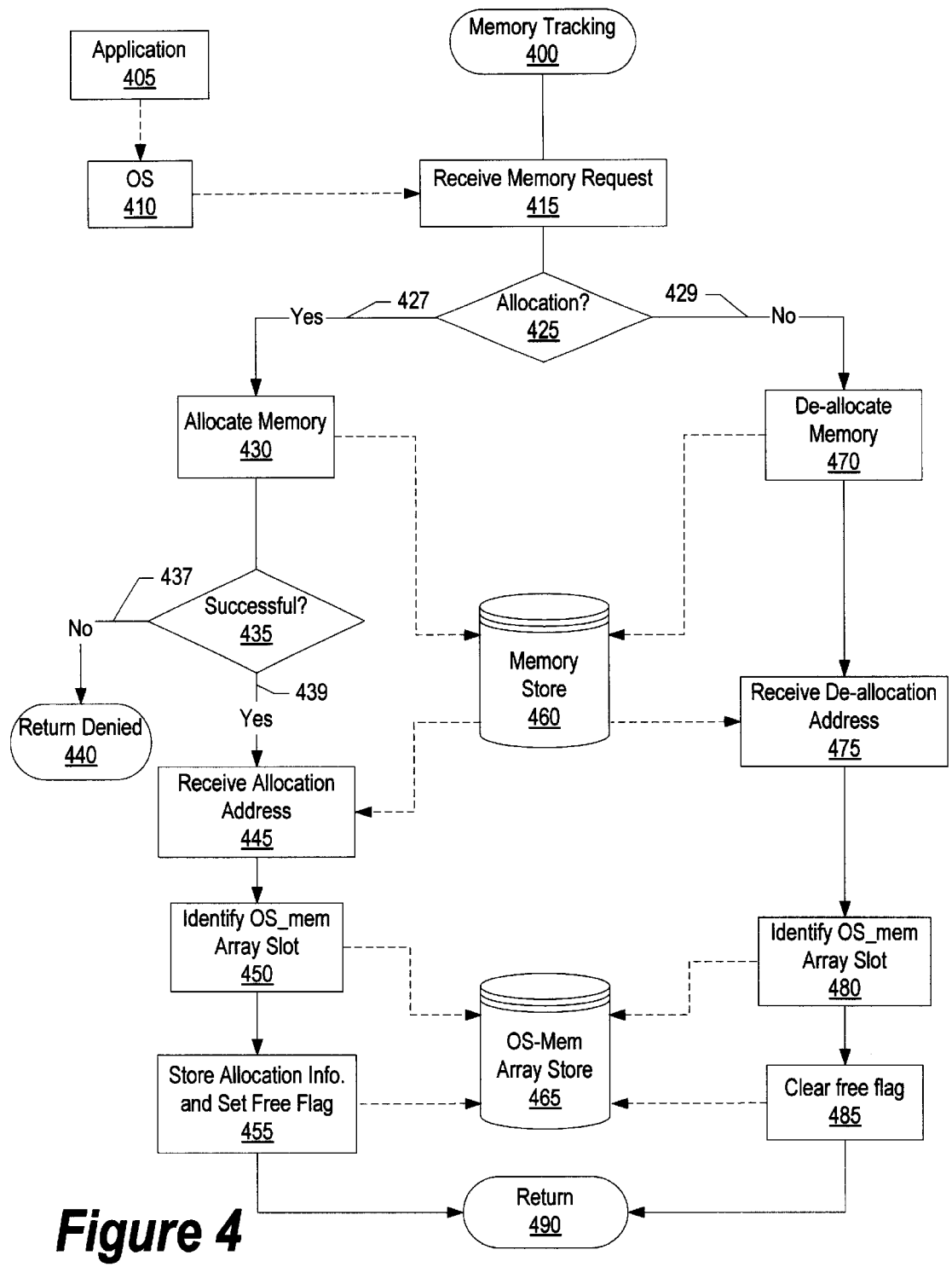
FIG. 4 is a flowchart showing steps taken in tracking memory allocations and de-allocations.

FIG. 4 is a flowchart showing steps taken in tracking memory allocations and de-allocations. Processing commences at 400, whereupon a memory request is received from OS 410 which is instigated by a request from application 405 (step 415). For example, OS 410 may be X-Windows and application 410 may request a spreadsheet window to open within X-Windows. OS 410 processes the request and sends a memory request in order to support the request from application 405.

A determination is made as to whether the OS request is a memory allocation request or a memory de-allocation request (decision 425). If the request is an allocation request, decision 425 branches to "Yes" branch 427 whereupon an attempt is made to allocate memory in memory store 460 (step 430).

A determination is made as to whether the memory allocation was successful (decision 435). If the memory request was not successful, decision 435 branches to "No" branch 437 whereupon a denied request is returned at 440. For example, OS 410 may request an amount of memory that memory store 460 is not able to support. In response, OS 410 may request a smaller amount of memory.

On the other hand, if the memory allocation was successful, decision 435 branches to "Yes" branch 439 whereupon information is retrieved corresponding to the memory allocation at step 445. For example, the information includes a pointer which specifies the starting address of the allocated memory.

A free memory array slot is identified in OS-memory array store 465 by checking the free flag corresponding to a memory array slot location (step 450). The free flag for each memory array slot is checked until the system identifies a free memory array slot (i.e. free flag is set to true). When a free memory array slot is identified, the memory allocation information is stored in the available memory array slot and the corresponding free flag is set to false (step 455).

If the OS request is a memory de-allocation request, decision 425 branches to "No" branch 429 whereupon the memory is de-allocated in memory store 460 at step 470. The de-allocated memory address is received at step 475, and the corresponding OS-memory array slot is identified at step 480. Processing checks each allocated memory array slot to locate the corresponding pointer that was stored during the corresponding memory allocation process. In embodiments with large numbers of memory array slots, an index, or hash table, can be used to quickly find the corresponding array slot. The free flag corresponding to the allocated memory array is cleared at step 485. Processing returns at step 490.

FIG. 5 is a flowchart analyzing memory array slots and generating a memory leak report either upon request or during shutdown operations. Processing commences at 500, whereupon a first array slot is retrieved from OS-memory array store 520 (step 510). A determination is made as to whether the free flag corresponding to the memory array slot is false, indicating a memory allocation that has not been properly de-allocated (decision 530). If the free flag is true, decision 530 branches to "No" branch 532 bypassing slot reporting steps.

On the other hand, if the free flag is false, the memory array slot includes memory allocation information that has not been properly de-allocated and decision 530 branches to "Yes" branch 538 whereupon the corresponding memory array slot information is sent to report store 550 (step 540).

A determination is made as to whether there are more memory array slots in the OS-memory array that need to be processed (decision 560). If there are more memory array slots, decisions 560 branches to "Yes" branch 562 which loops back to retrieve (step 565) and process the next memory array slot from OS-memory array store 520. This looping continues until there are no more memory array slots to process, at which point decision 560 branches to "No" branch 568.

A determination is made as to whether to display or print a report that includes memory array slot information in report store 550 (decision 570). For example, the user may choose to view the report data, or the user may be collecting data on a frequent basis and choose to view the report data at a later time. If the user chooses not to view the report data, decision 570 branches to "No" branch 572 bypassing the report display step. On the other hand, if the user chooses to view the report data, decision 570 branches to "Yes" branch 578 whereupon the report is displayed or printed at step 580. Processing returns at 590.

Figure 6:
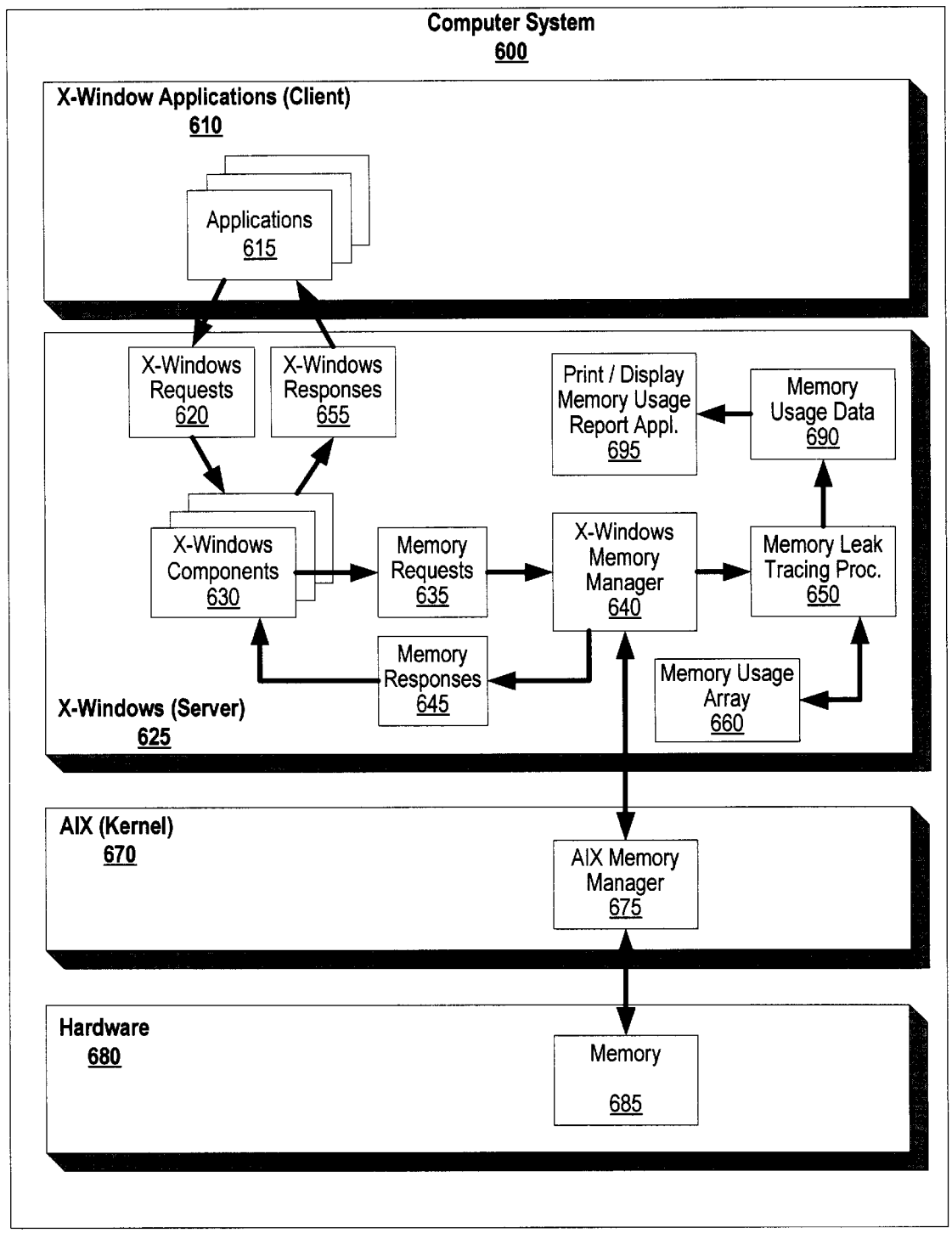
FIG. 6 is a system diagram of a memory leak detector used in an X-Windows environment.

FIG. 6 is a system diagram of a memory leak detector used in an X-Windows environment. Computer system 600 is shown including hardware 680. When computer system 600 is started, the operating system (AIX Kernel 670) is booted and loaded to control the computer system hardware, such as memory 685. AIX Kernel 675 includes memory manager 675 used to manage system memory 685.

X-Windows 625 is invoked from AIX and interfaces with the kernel in order to provide a graphical user interface to users and provide a variety of components to manage X-Windows applications 610. In a client-server sense, X-Windows acts as a server for X-Windows based application clients that request various services from the X-Windows server. Various environment variables can be set prior to loading X-Windows in order to customize the X-Windows operating environment. In one embodiment, an environment variable is used to indicate whether X-Windows should trace memory leaks.

In the embodiment shown in FIG. 6, memory leak tracing has been initiated. One or more X-Windows applications 615 send a variety of X-Window requests 620 to X-Windows server 625. These requests are handled by one or more X-Windows components 630. Some of these requests may cause the X-Windows component to request additional memory. In order to receive memory, an X-Window components send memory requests 635 to X-Windows memory manager 640. X-Windows memory manager 640 uses AIX memory manager 675 to allocate or de-allocate memory 685. An address (or NULL if the request failed) is returned to the X-Window components in memory responses 645. The X-Window components then use the memory to fulfill the application requests and return responses 655 to the X-Window applications.

If memory leak tracing has been initiated, the X-Windows memory manager provides memory leak tracing procedure 650 with information regarding the memory request. If the memory request is to allocate memory, the memory leak tracing procedure stores information pertaining to the allocation in memory usage array 660. If the memory request is to de-allocate memory, the memory leak tracing procedure removes the memory usage information from the memory usage array by marking the memory array slot as available (see FIG. 2 for details regarding memory array slots). This tracing of memory usage by X-Windows components continues while X-Windows operates. When an X-Windows shutdown request is received, memory leak tracing procedure 650 sends memory usage data 690 to print/display memory usage report application 695 which displays or prints memory leak information to the user (see FIG. 10 for an example memory leak report).

Figure 7:
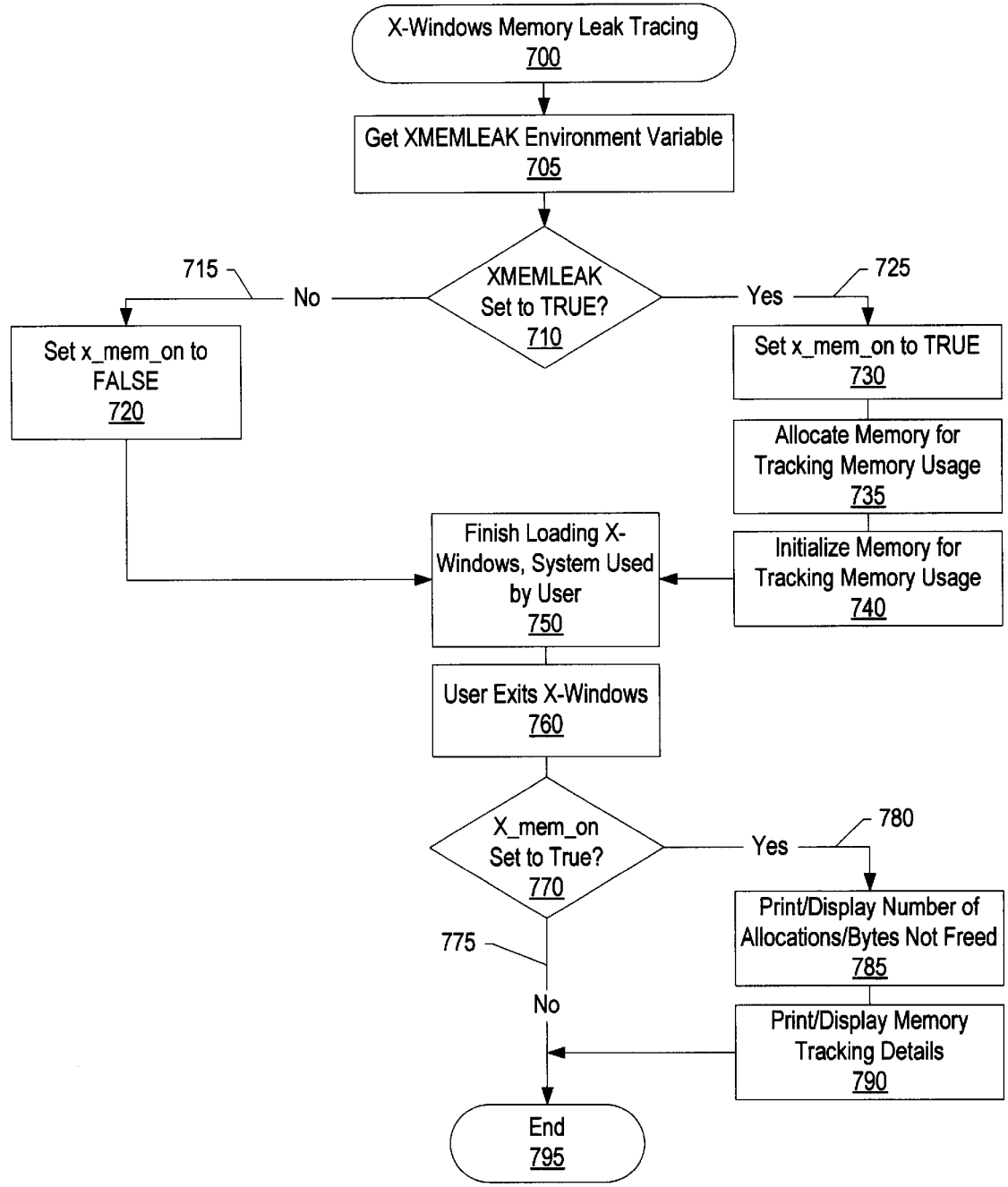
FIG. 7 is a flowchart showing memory leak tracing within an X-Windows environment.

FIG. 7 is a flowchart showing memory leak tracing within an X-Windows environment. Processing commences at 700 whereupon an environment variable is retrieved (step 705) that indicates whether to trace memory leaks.

A determination is made as to whether the environment flag is set to TRUE (decision 710). If the environment variable is not set, decision 710 branches to "no" branch 715 whereupon a variable within the X-Windows server is set FALSE indicating that memory usage will not be traced. On the other hand, if the environment variable is set, decision 710 branches to "yes" branch 725 whereupon the variable within the X-Windows server is set to TRUE indicating that memory usage will be traced (step 730), memory is allocated for tracking (step 735), and the allocated memory is initialized into multiple memory array slots used to keep track of memory usage (step 740).

After the memory leak environment variable has been processed (either TRUE or FALSE), X-Windows completes loading and the X-Windows environment is used by the user (step 750). At some point, the user issues a shutdown command requesting to exit X-Windows (step 760). During shutdown processing, a determination is made as to whether the memory tracing variable is set to TRUE (decision 770). If the variable is not set to TRUE, decision 770 branches to "no" branch 775 and processing ends at 795. On the other hand, if memory tracing was turned on and the variable set to TRUE, decision 770 branches to "yes" branch 780 whereupon a summary of the allocations and bytes not released is displayed or printed (step 785) and detailed memory tracing information is displayed or printed (step 790). X-Windows processing thereafter ends at 795.

Figure 8:
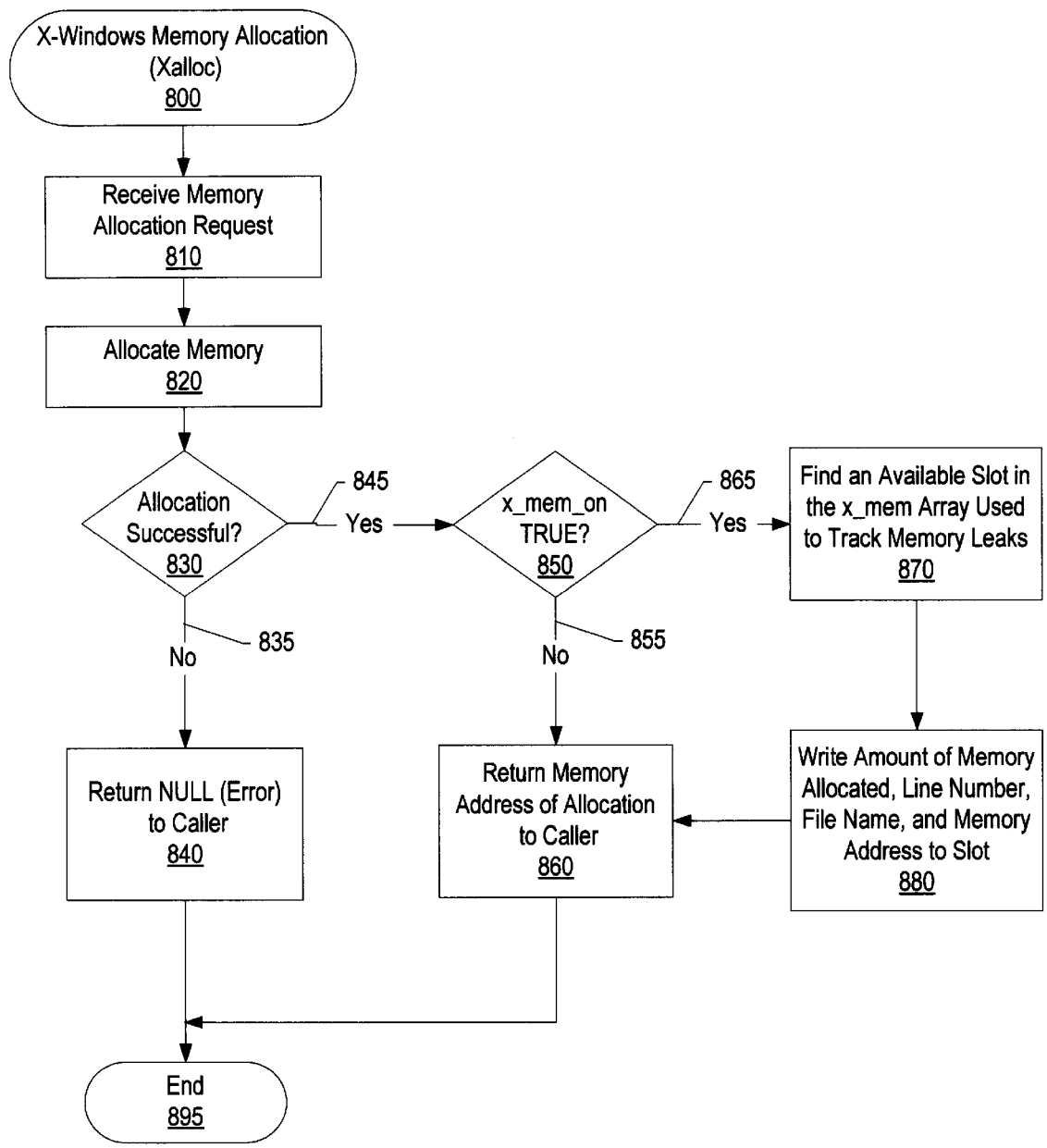
FIG. 8 is a flowchart showing memory allocation and tracing within an X-Windows environment.

FIG. 8 is a flowchart showing memory allocation and tracing within an X-Windows environment. Processing commences at 800 whereupon the X-Windows memory manager receives a memory allocation request (step 810). The X-Windows memory manager attempts to allocate memory to satisfy the allocation request (step 820).

A determination is made as to whether the attempted memory allocation was successful (decision 830). If the memory allocation was not successful, decision 830 branches to "no" branch 840 whereupon a NULL response is returned to the caller indicating that the memory allocation failed (step 840) and memory manager processing ends at 895.

On the other hand, if the memory allocation was successful, decision 830 branches to "yes" branch 845 whereupon a determination is made as to whether the memory tracing variable has been set (decision 850). If the memory tracing variable has not been set, decision 850 branches to "no" branch 855 whereupon the address of the allocated memory is returned to the calling program (step 860) and memory manager processing ends at 895.

On the other hand, if the memory tracing variable has been set, decision 850 branches to "yes" branch 865 whereupon the memory tracing routine locates an available slot in the memory tracing array used to trace memory leaks (step 870). Details regarding the memory allocation (i.e., the amount of memory allocated, the line number of the requesting component, the file name of the requesting component, the memory address, etc.) are stored in the located slot (step 880). The memory address is returned to the requesting component (step 860) and memory manager processing ends at 895.

Figure 9:
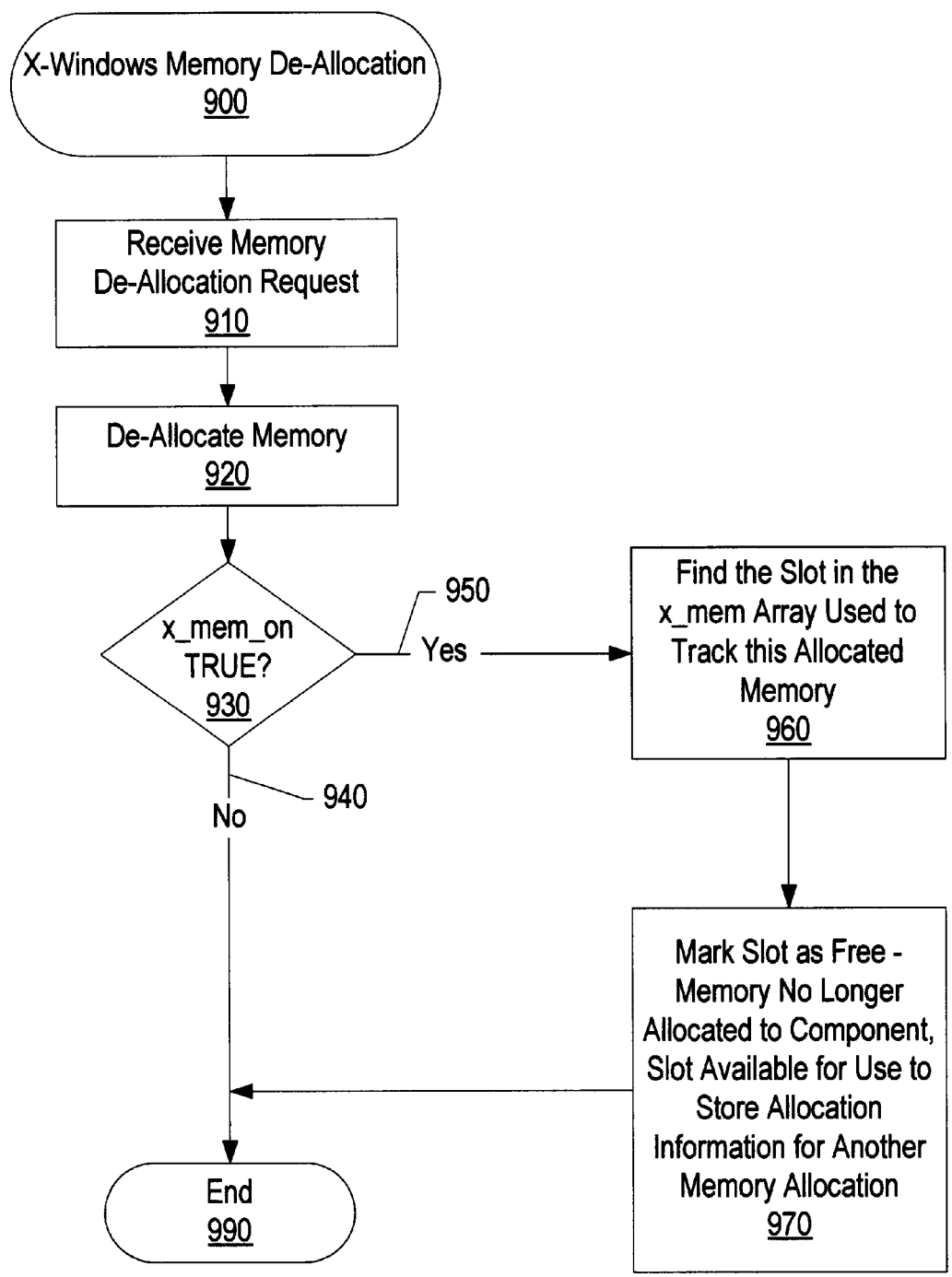
FIG. 9 is a flowchart showing memory de-allocation within an X-Windows environment.

FIG. 9 is a flowchart showing memory de-allocation within an X-Windows environment. X-Windows memory de-allocation processing commences at 900 whereupon a memory de-allocation request is received from a component (step 910). The X-Windows memory manager de-allocates the memory (step 920). A determination is made as to whether memory tracing has been turned on (decision 930). If memory tracing has no been turned on, decision 930 branches to "no" branch 940 and memory manager processing ends at 990.

On the other hand, if memory tracing as been turned on, decision 930 branches to "yes" branch 950. The slot in the memory leak array that was used to track the memory is located (step 960). The located slot is marked as free, or available, indicating that the memory is no longer allocated to the component and that the slot is available for use to track another memory allocation (step 970). Memory manager processing thereafter ends at 990.

FIG. 10 is a sample X-Windows memory leak report showing X-Windows components that did not release allocated memory. Memory leak report 1000 includes summary and detail information regarding X-Windows components that did not de-allocate memory. Memory leak summary 1010 includes information regarding the number of memory allocations (mallocs) that were not freed an the total number of bytes that were not freed. In the example shown, 50 memory allocations were not freed and these un-freed memory allocations totaled 16,972 bytes of memory storage.

Memory detail information 1020 includes information regarding the 50 memory allocations that were not freed. Memory detail information 1020 includes leak number 1030 (i.e., a sequential number from 1 to 50 corresponding to the 50 un-freed memory allocations). Memory detail information 1020 also includes file name 1040 for the component that corresponds to each of the un-freed memory allocation. This information allows developers to determine which X-Windows components should be analyzed and modified to prevent memory leaks. In addition, the line number (1050) from the component where the memory allocation was requested is included to further aid developers in cleaning up memory leaks in X-Windows components. Memory size 1060 corresponds to the number of bytes allocated to each of the un-freed memory allocations. Finally, the address (or pointer), of the un-freed memory allocation is included in the report. Using the information provided in report 1000 aids developers in cleaning up memory leaks occurring in X-Windows components better utilizing the computer system's memory resources.

Figure 11:
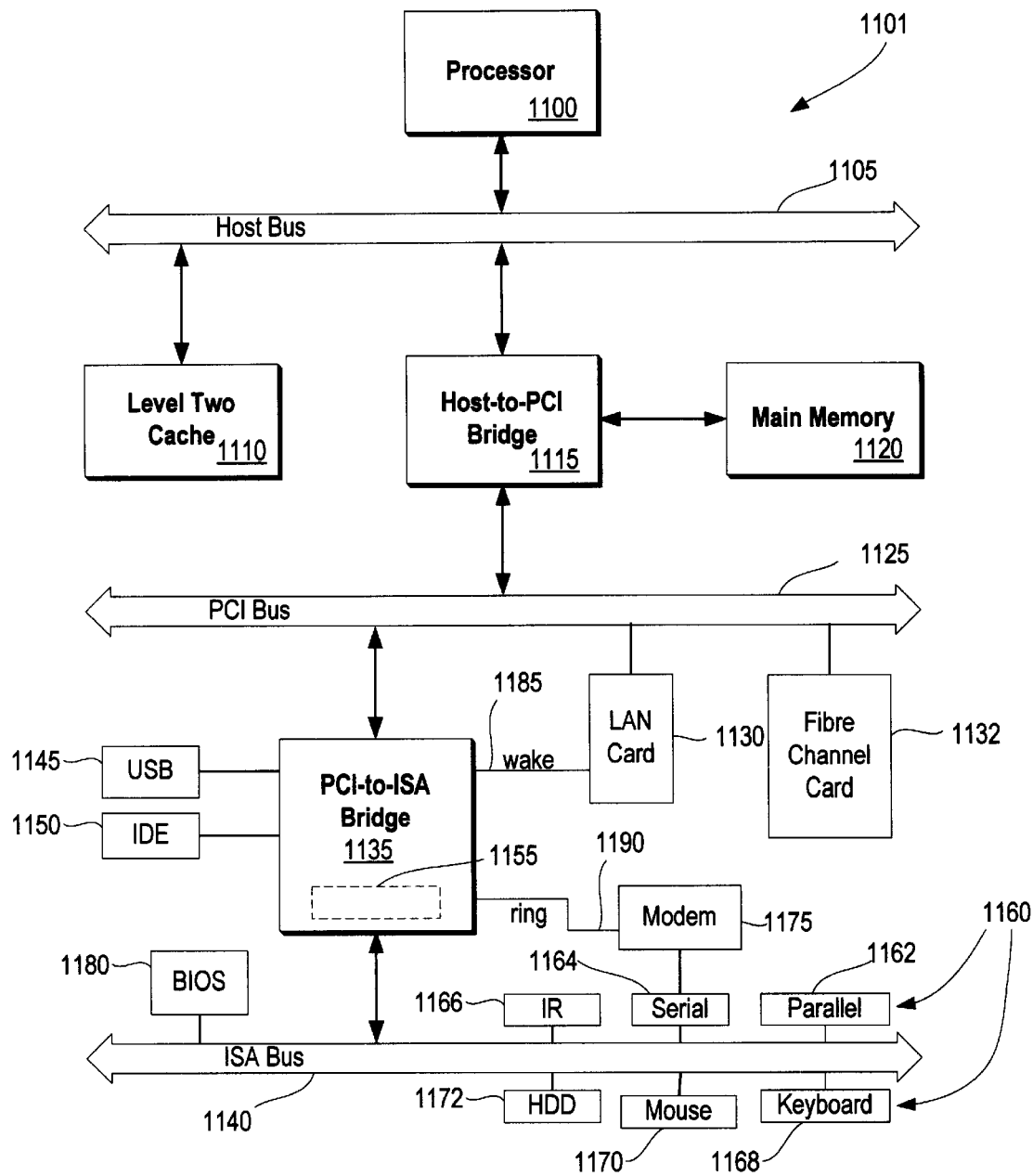
FIG. 11 is a block diagram of an information handling system capable of implementing the present invention.

FIG. 11 illustrates information handling system 1101 which is a simplified example of a computer system capable of performing the server and client operations described herein. Computer system 1101 includes processor 1100 which is coupled to host bus 1105. A level two (L2) cache memory 1110 is also coupled to the host bus 1105. Host-to-PCI bridge 1115 is coupled to main memory 1120, includes cache memory and main memory control functions, and provides bus control to handle transfers among PCI bus 1125, processor 1100, L2 cache 1110, main memory 1120, and host bus 1105. PCI bus 1125 provides an interface for a variety of devices including, for example, LAN card 1130. PCI-to-ISA bridge 1135 provides bus control to handle transfers between PCI bus 1125 and ISA bus 1140, universal serial bus (USB) functionality 1145, IDE device functionality 1150, power management functionality 1155, and can include other functional elements not shown, such as a real-time clock (RTC), DMA control, interrupt support, and system management bus support. Peripheral devices and input/output (I/O) devices can be attached to various interfaces 1160 (e.g., parallel interface 1162, serial interface 1164, infrared (IR) interface 1166, keyboard interface 1168, mouse interface 1170, and fixed disk (HDD) 1172) coupled to ISA bus 1140. Alternatively, many I/O devices can be accommodated by a super I/O controller (not shown) attached to ISA bus 1140.

BIOS 1180 is coupled to ISA bus 1140, and incorporates the necessary processor executable code for a variety of low-level system functions and system boot functions. BIOS 1180 can be stored in any computer readable medium, including magnetic storage media, optical storage media, flash memory, random access memory, read only memory, and communications media conveying signals encoding the instructions (e.g., signals from a network). In order to attach computer system 1101 to another computer system to copy files over a network, LAN card 1130 is coupled to PCI bus 1125 and to PCI-to-ISA bridge 1135. Similarly, to connect computer system 1101 to an ISP to connect to the Internet using a telephone line connection, modem 1175 is connected to serial port 1164 and PCI-to-ISA Bridge 1135.

While the computer system described in FIG. 11 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of detecting memory leaks in a computer system, said method comprising:

receiving one or more memory allocation requests from operating system components;

allocating memory in response to the allocation requests;

identifying an available memory area within the allocated memory to store memory allocation data corresponding to the memory allocation requests, the memory allocation data including component identification data identifying the operating system components and memory allocation data corresponding to the memory allocation requests;

storing the memory allocation data in the identified available memory area, the storing performed by a second operating system component;

receiving memory de-allocation requests corresponding to one or more of the memory allocation requests;

clearing the memory areas corresponding to the memory de-allocation requests;

identifying one or more operating system components with memory leaks by reading the un-cleared memory areas;

formatting the memory into a plurality of memory array slots, wherein each of the memory array slots is adapted to store data corresponding to a separate memory allocation request; and creating a plurality of fields within the memory array slots, at least one of the fields being selected from the group consisting of an operating system component name, a location, a size, and a pointer.

2. The method as described in claim 1 further comprising:

generating a memory leak report based on the identification of operating system components with memory leaks.

3. The method as described in claim 2 further comprising:

writing a memory leak report summary that includes the number of un-cleared memory allocations and a total amount of un-cleared memory corresponding to the un-cleared memory allocations.

4. The method as described in claim 1 further comprising:

locating the stored memory allocation data using a hash table.

5. The method as described in claim 1 further comprising:

receiving a tracking option; and setting a memory leak flag in response to the receiving, wherein the identifying, storing, and clearing are only performed in response to the memory leak flag being set.

6. The method as described in claim 1 wherein the operating system components are X-Windows components and wherein the allocating is performed by an X-Windows memory manager, the method further comprising:

retrieving an memory leak environment variable requesting that memory leak detection be enabled;

allocating the memory areas in response to receiving the memory leak environment variable;

formatting the memory areas so that each memory area includes a component identifier field, a location field, a memory size field, and a memory address field;

tracking the memory allocations and de-allocations using a memory leak tracing procedure running within an X-Windows component, the tracking including the identifying, the storing, and the clearing steps;

writing component names corresponding to the X-Windows components into the component identifier fields;

writing line numbers corresponding to program line numbers in the X-Windows components where memory allocation requests were made to the location fields;

writing memory allocation sizes to the memory size fields;

writing memory addresses to the memory address fields corresponding to each of the memory allocations;

receiving a memory leak report request;

reading the un-cleared memory areas corresponding to at least one of the memory allocation requests;

writing data from the component identifier fields, the location fields, the memory size fields, and the memory address fields for each of the un-cleared memory areas to a memory leak report; and providing the memory leak report to an X-Windows user.

7. An information handling system comprising:

one or more processors;

a memory accessible by the processors;

one or more nonvolatile storage devices accessible by the processors;

a memory leak detection tool to detect memory leaks, the memory leak detection tool including:

means for receiving one or more memory allocation requests from operating system components;

means for allocating memory in response to the allocation requests;

means for identifying an available memory area within the allocated memory to store memory allocation data corresponding to the memory allocation requests, the memory allocation data including component identification data identifying the operating system components and memory allocation data corresponding to the memory allocation requests;

means for storing the memory allocation data in the identified available memory area, the storing performed by a second operating system component;

means for receiving memory de-allocation requests corresponding to one or more of the memory allocation requests;

means for clearing the memory areas corresponding to the memory de-allocation requests;

means for identifying one or more operating system components with memory leaks by reading the un-cleared memory areas;

means for formatting the memory into a plurality of memory array slots, wherein each of the memory array slots is adapted to store data corresponding to a separate memory allocation request; and means for creating a plurality of fields within the memory array slots, at least one of the fields being selected from the group consisting of an operating system component name, a location, a size, and a pointer.

8. The information handling system as described in claim 7 further comprising:

means for generating a memory leak report based on the identification of operating system components with memory leaks.

9. The information handling system as described in claim 8 further comprising:

means for writing a memory leak report summary that includes the number of un-cleared memory allocations and a total amount of un-cleared memory corresponding to the un-cleared memory allocations.

10. The information handling system as described in claim 7 further comprising:

means for receiving a tracking option; and means for setting a memory leak flag in response to the receiving, wherein the identifying, storing, and clearing are only performed in response to the memory leak flag being set.

11. The information handling system as described in claim 7 wherein the operating system components are X-Windows components and wherein the means for allocating is performed by an X-Windows memory manager, the information handling system further comprising:

means for retrieving an memory leak environment variable requesting that memory leak detection be enabled;

means for allocating the memory areas in response to receiving the memory leak environment variable;

means for formatting the memory areas so that each memory area includes a component identifier field, a location field, a memory size field, and a memory address field;

means for tracking the memory allocations and de-allocations using a memory leak tracing procedure running within an X-Windows component, the tracking including the identifying, the storing, and the clearing steps;

means for writing component names corresponding to the X-Windows components into the component identifier fields;

means for writing line numbers corresponding to program line numbers in the X-Windows components where memory allocation requests were made to the location fields;

means for writing memory allocation sizes to the memory size fields;

means for writing memory addresses to the memory address fields corresponding to each of the memory allocations;

means for receiving a memory leak report request;

means for reading the un-cleared memory areas corresponding to at least one of the memory allocation requests;

means for writing data from the component identifier fields, the location fields, the memory size fields, and the memory address fields for each of the un-cleared memory areas to a memory leak report; and means for providing the memory leak report to an X-Windows user.

12. A computer program product stored in a computer operable media for detecting memory leaks in a computer system, said computer program product comprising:

means for receiving one or more memory allocation requests from operating system components;

means for allocating memory in response to the allocation requests;

means for identifying an available memory area within the allocated memory to store memory allocation data corresponding to the memory allocation requests, the memory allocation data including component identification data identifying the operating system components and memory allocation data corresponding to the memory allocation requests;

means for storing the memory allocation data in the identified available memory area, the storing performed by a second operating system component;

means for receiving memory de-allocation requests corresponding to one or more of the memory allocation requests;

means for clearing the memory areas corresponding to the memory de-allocation requests;

means for identifying one or more operating system components with memory leaks by reading the un-cleared memory areas;

means for formatting the memory into a plurality of memory array slots, wherein each of the memory array slots is adapted to store data corresponding to a separate memory allocation request; and means for creating a plurality of fields within the memory array slots, at least one of the fields being selected from the group consisting of an operating system component name, a location, a size, and a pointer.

13. The computer program product as described in claim 12 further comprising:

means for generating a memory leak report based on the identification of operating system components with memory leaks.

14. The computer program product as described in claim 13 further comprising:

means for writing a memory leak report summary that includes the number of un-cleared memory allocations and a total amount of un-cleared memory corresponding to the un-cleared memory allocations.

15. The computer program product as described in claim 12 further comprising:

means for locating the stored memory allocation data using a hash table.

16. The computer program product as described in claim 12 further comprising:

means for receiving a tracking option; and means for setting a memory leak flag in response to the receiving, wherein the identifying, storing, and clearing are only performed in response to the memory leak flag being set.

17. The computer program product as described in claim 12 wherein the operating system components are X-Windows components and wherein the means for allocating is performed by an X-Windows memory manager, the computer program product further comprising:

means for retrieving an memory leak environment variable requesting that memory leak detection be enabled;

means for allocating the memory areas in response to receiving the memory leak environment variable;

means for formatting the memory areas so that each memory area includes a component identifier field, a location field, a memory size field, and a memory address field;

means for tracking the memory allocations and de-allocations using a memory leak tracing procedure running within an X-Windows component, the tracking including the identifying, the storing, and the clearing steps;

means for writing component names corresponding to the X-Windows components into the component identifier fields;

means for writing line numbers corresponding to program line numbers in the X-Windows components where memory allocation requests were made to the location fields;

means for writing memory allocation sizes to the memory size fields;

means for writing memory addresses to the memory address fields corresponding to each of the memory allocations;

means for receiving a memory leak report request;

means for reading the un-cleared memory areas corresponding to at least one of the memory allocation requests;

means for writing data from the component identifier fields, the location fields, the memory size fields, and the memory address fields for each of the un-cleared memory areas to a memory leak report; and means for providing the memory leak report to an X-Windows user.

* * * * *